US008975596B1

(12) United States Patent
Matthews et al.

(10) Patent No.: US 8,975,596 B1
(45) Date of Patent: Mar. 10, 2015

(54) WATER PURIFYING DRINK CONTAINERS

(75) Inventors: Dan Richard Matthews, Gilbert, AZ (US); Kurt Kuhlmann, Santa Clara, CA (US)

(73) Assignee: Meridian Design, Inc., Gilbert, AZ (US)

(*) Notice: Subject to any disclaimer, the term of this patent is extended or adjusted under 35 U.S.C. 154(b) by 0 days.

(21) Appl. No.: 13/555,030

(22) Filed: Jul. 20, 2012

(51) Int. Cl.
*C02F 1/32* (2006.01)
*B65D 51/24* (2006.01)
*B65D 81/24* (2006.01)

(52) U.S. Cl.
CPC .............. *B65D 81/24* (2013.01); *B65D 51/24* (2013.01)
USPC .................................. 250/432 R; 250/455.11

(58) Field of Classification Search
USPC .............. 250/432 R–432 PD, 453.11, 455.11
See application file for complete search history.

(56) References Cited

U.S. PATENT DOCUMENTS

| 1,190,609 | A | 7/1916 | Von Recklinghausen |
| 1,898,365 | A | 2/1933 | Harding |
| 1,965,947 | A | 7/1934 | Prouty |
| 2,338,387 | A | 1/1944 | Whitman |
| 2,470,806 | A | 5/1949 | Del Cueto |
| 2,669,661 | A | 2/1954 | Riddiford et al. |
| 3,500,041 | A | 3/1970 | Kassing |
| 3,843,521 | A | 10/1974 | Zeff |
| 3,906,236 | A | 9/1975 | Callahan |
| 3,970,856 | A | 7/1976 | Mahaffey et al. |
| 4,066,551 | A | 1/1978 | Stern |
| 4,101,777 | A | 7/1978 | Reid |
| 4,184,076 | A | 1/1980 | Kosnoff |
| 4,274,970 | A | 6/1981 | Beitzel |
| 4,276,256 | A | 6/1981 | Karamian |
| 4,280,912 | A | 7/1981 | Berry, III et al. |
| 4,296,328 | A | 10/1981 | Regan |
| 4,390,432 | A | 6/1983 | Takeguchi et al. |
| 4,416,854 | A | 11/1983 | Nielsen |
| 4,559,478 | A | 12/1985 | Fuller et al. |
| 4,676,896 | A | 6/1987 | Norton |
| 4,752,401 | A | 6/1988 | Bodenstein |
| 4,755,292 | A * | 7/1988 | Merriam ...................... 210/192 |
| 4,762,613 | A | 8/1988 | Snowball |

(Continued)

FOREIGN PATENT DOCUMENTS

| AU | 199859637 B2 | 1/2001 |
| CA | 2279860 C | 7/2007 |

(Continued)

OTHER PUBLICATIONS

International Search Reprot for PCT/US2005/009155 dated Jul. 7, 2005.

(Continued)

*Primary Examiner* — Jack Berman
*Assistant Examiner* — David E Smith
(74) *Attorney, Agent, or Firm* — Parsons Behle & Latimer

(57) ABSTRACT

Water purifying drink containers include a liquid container, a cap assembly removably coupled to the liquid container, and a purification assembly that emits ultraviolet (UV) light in the germicidal spectrum to purify a volume of drink liquid held in the liquid container. In some embodiments, the purification assembly includes a UV bulb positioned within a recess of the cap assembly facing the internal compartment of the liquid container. In some embodiments, the UV bulb further emits light in the visible spectrum and the drink container includes an indicator that becomes illuminated with visible light to indicate to a user when the UV bulb is emitting UV light.

22 Claims, 5 Drawing Sheets

(56) References Cited

U.S. PATENT DOCUMENTS

| | | | |
|---|---|---|---|
| 4,790,946 A | 12/1988 | Jansen | |
| 4,849,100 A | 7/1989 | Papandrea | |
| 4,857,204 A | 8/1989 | Joklik | |
| 4,902,411 A | 2/1990 | Lin | |
| 4,912,375 A | 3/1990 | Deglon et al. | |
| 4,981,651 A | 1/1991 | Horng | |
| 4,992,169 A | 2/1991 | Izumiya | |
| 5,106,495 A | 4/1992 | Hughes | |
| 5,173,269 A | 12/1992 | Mon et al. | |
| 5,208,461 A | 5/1993 | Tipton | |
| 5,266,215 A | 11/1993 | Engelhard | |
| 5,393,419 A | 2/1995 | Tiede et al. | |
| 5,445,729 A | 8/1995 | Monroe et al. | |
| 5,484,538 A | 1/1996 | Woodward | |
| 5,597,482 A | 1/1997 | Melyon | |
| 5,628,895 A | 5/1997 | Zucholl | |
| 5,780,860 A | 7/1998 | Gadgil et al. | |
| 5,843,309 A | 12/1998 | Mancil | |
| 5,845,504 A | 12/1998 | LeBleu | |
| 5,900,212 A | 5/1999 | Maiden et al. | |
| 5,919,422 A | 7/1999 | Yamanaka et al. | |
| 6,042,720 A * | 3/2000 | Reber et al. | 210/85 |
| 6,110,424 A | 8/2000 | Maiden et al. | |
| 6,144,175 A | 11/2000 | Parra | |
| 6,264,836 B1 * | 7/2001 | Lantis | 210/188 |
| 6,436,299 B1 | 8/2002 | Baarman et al. | |
| 6,451,202 B1 | 9/2002 | Kuennen et al. | |
| 6,468,420 B1 | 10/2002 | Kunkel | |
| 6,514,405 B1 | 2/2003 | Lifschitz | |
| 6,579,495 B1 | 6/2003 | Maiden | |
| 6,589,490 B1 | 7/2003 | Parra | |
| 6,726,839 B2 | 4/2004 | Taylor, Jr. | |
| 6,764,888 B2 | 7/2004 | Khan et al. | |
| 6,767,453 B2 | 7/2004 | Lifschitz | |
| 6,861,652 B2 | 3/2005 | Wismeth | |
| 6,909,101 B2 | 6/2005 | Nishioka | |
| 6,943,377 B2 | 9/2005 | Gaska et al. | |
| 7,002,161 B2 | 2/2006 | Greene | |
| 7,081,225 B1 | 7/2006 | Hollander | |
| 7,306,716 B2 * | 12/2007 | Baarman | 210/143 |
| 7,361,904 B2 | 4/2008 | Cassassuce et al. | |
| 7,390,417 B2 | 6/2008 | Kuhlmann et al. | |
| 7,550,089 B2 | 6/2009 | Kuhlmann et al. | |
| 7,641,790 B2 | 1/2010 | Maiden | |
| 7,713,483 B2 | 5/2010 | Maiden | |
| 7,741,806 B2 | 6/2010 | Kuhlmann et al. | |
| 2002/0131906 A1 | 9/2002 | Wismeth | |
| 2004/0007538 A1 * | 1/2004 | Siriphraiwan | 210/748 |
| 2005/0118054 A1 * | 6/2005 | Lentz et al. | 422/3 |
| 2005/0189290 A1 | 9/2005 | Maiden | |
| 2005/0258108 A1 * | 11/2005 | Sanford | 210/748 |
| 2006/0011526 A1 * | 1/2006 | Baarman et al. | 210/143 |
| 2006/0099449 A1 * | 5/2006 | Amano et al. | 428/690 |
| 2006/0163169 A1 * | 7/2006 | Eckhardt et al. | 210/748 |
| 2008/0210608 A1 * | 9/2008 | Abe et al. | 210/96.1 |
| 2008/0237233 A1 | 10/2008 | Choi et al. | |
| 2009/0084734 A1 * | 4/2009 | Yencho | 210/741 |
| 2009/0205972 A1 | 8/2009 | Kuhlmann et al. | |
| 2010/0044582 A1 * | 2/2010 | Cooper et al. | 250/455.11 |
| 2011/0038754 A1 * | 2/2011 | James | 422/24 |
| 2011/0174993 A1 | 7/2011 | Blain | |

FOREIGN PATENT DOCUMENTS

| | | |
|---|---|---|
| CN | 1113040 C | 7/2003 |
| DE | 4228860 A1 | 3/1994 |
| DE | 19911443 A1 | 9/2000 |
| DE | 69834105 T2 | 1/2007 |
| EP | 0966401 B1 | 4/2006 |
| ES | 2262222 | 11/2006 |
| GB | 2301272 A | 11/1996 |
| JP | 02003892 | 1/1990 |
| JP | 02006892 | 1/1990 |
| JP | 08033887 | 2/1996 |
| JP | 08066678 | 3/1996 |
| JP | 08117742 | 5/1996 |
| JP | 11155932 | 6/1999 |
| JP | 2001347265 A | 12/2001 |
| TR | 199901784 T2 | 10/1999 |
| WO | WO9738272 | 10/1997 |
| WO | WO9832700 | 7/1998 |
| WO | WO0009449 | 2/2000 |
| WO | WO0212127 A2 | 2/2002 |
| WO | WO2004028290 A1 | 4/2004 |
| WO | WO2005090241 A1 | 9/2005 |

OTHER PUBLICATIONS

Ultra Violet Sterilization for Water; http://www.envirodoc.com/uv-sterilization-water.htm; Mar. 1, 2005.

UV Water Purifiers by American Air and Water; http://www.americanairandwater.com/water/w_prods.htm; Mar. 1, 2005.

Steri-Pen (Steripen) Ultraviolet Water Purifier, Portable Water Purfier; http://store.yahoo.com/campingsurvivale/stulwapupowa.html; Mar. 1, 2005.

"Finally, Germicidal UV LEDS for the Rest of US!" LED Development Blog, Nov. 29, 2007; http://leddev.wordpress.com/?s=UVC.

"Light-emitting diode." downloaded from www.wikipedia.com on Oct. 5, 2012.

Mcdonald, Joann "Deep UV LEDs Research Major Milestone in Water Purification," CompoundSemi News, Mar. 15, 2005 downloaded on or about Oct. 31, 2007 from www.solidstatelighting.net.

PlexiGlass Sunactive XT Clear 24770 Product Description, Degussa AG, Apr. 2002.

Sensor Electronic Technology, Inc, list of 2005-2006 articles, downloaded on or about Oct. 31, 2007 from www.s-et.com.

"SET seeks deep UV led market penetration," Jan. 7, 2005, downloaded on or about Oct. 31, 2007 from www.compoundsemiconductor.net.

On or about Oct. 31, 2007 from www.compoundsemiconductor.net.

Gasla,R.,Etal., "Solid-State Ultraviolet Light Sources," IEEE Sensors Councel Newsletter No. 6; Jan. 2008; downloaded on or about Aug. 8, 2008 from www.ewh.ieee.org/tc/sensors/newsletters/number6/newsletter6.htm.

"UV Rays Used to Purify Water," New Products & Services, The Nikkei Weekly, Feb. 7, 1994.

"SET wins contracts for AIN resarch;" Wide Bandgap News; Mar. 2004, p. 13; downloaded on or about Oct. 31, 2007 from www.compoundsemiconductor.net.

* cited by examiner

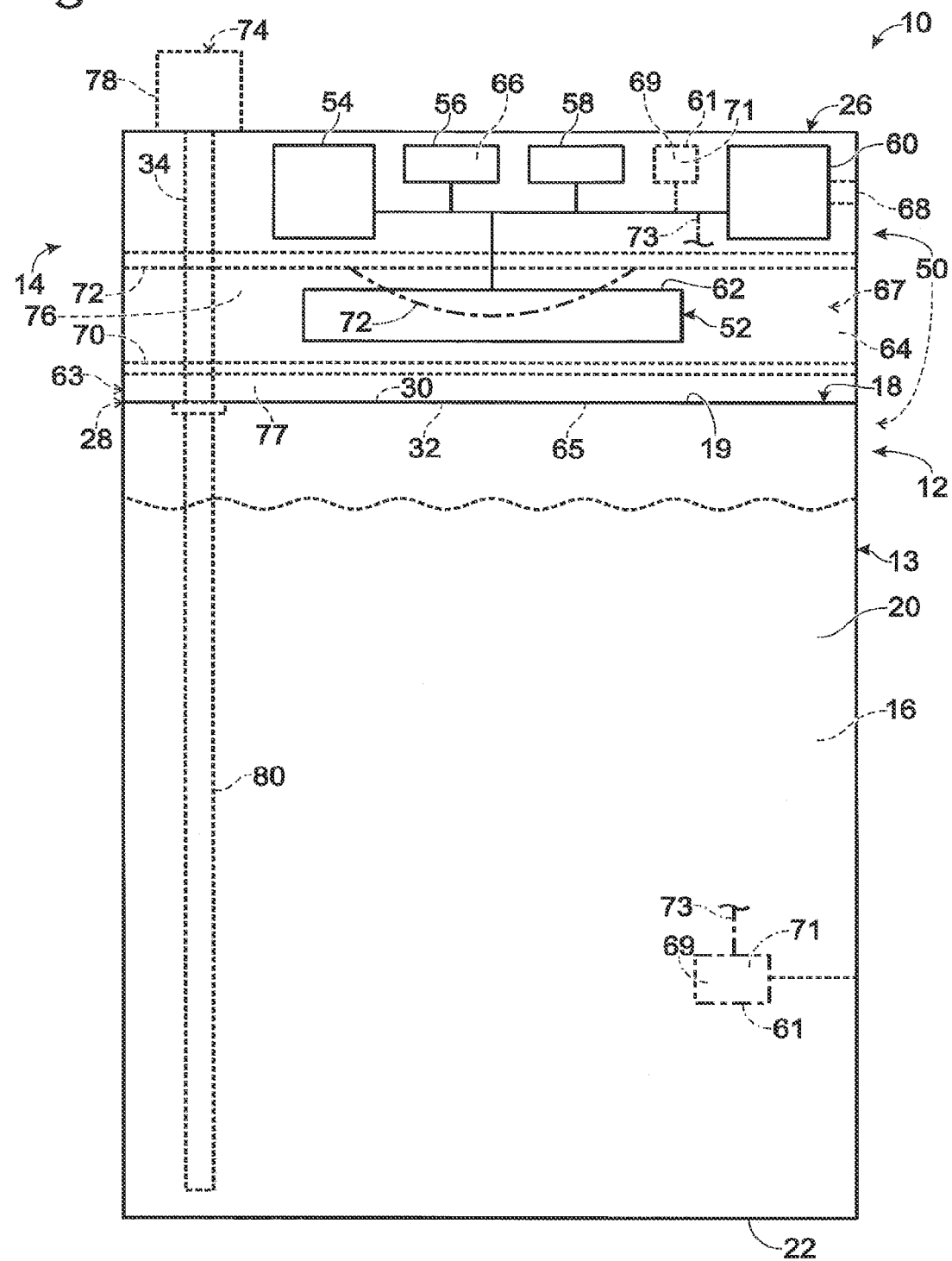

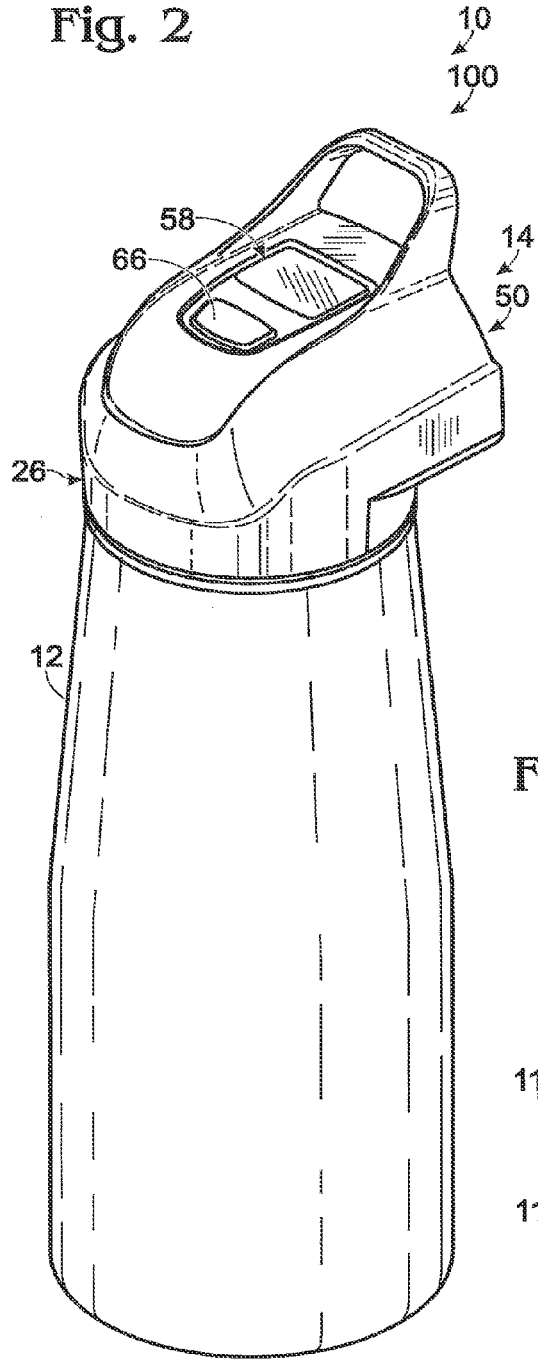
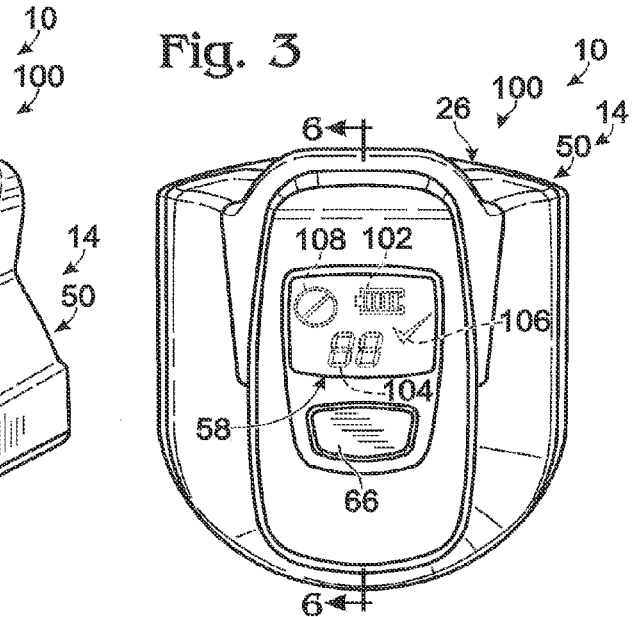
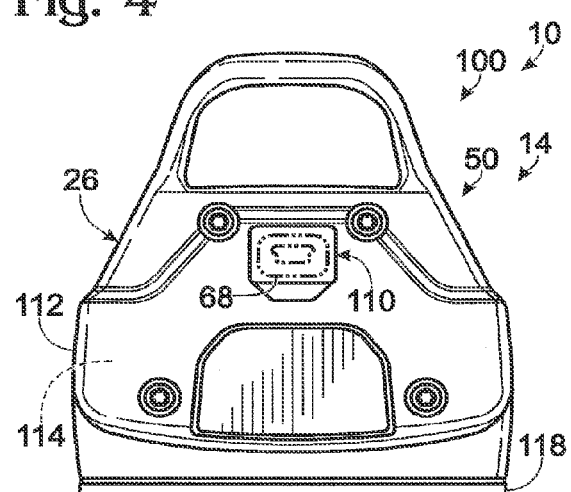

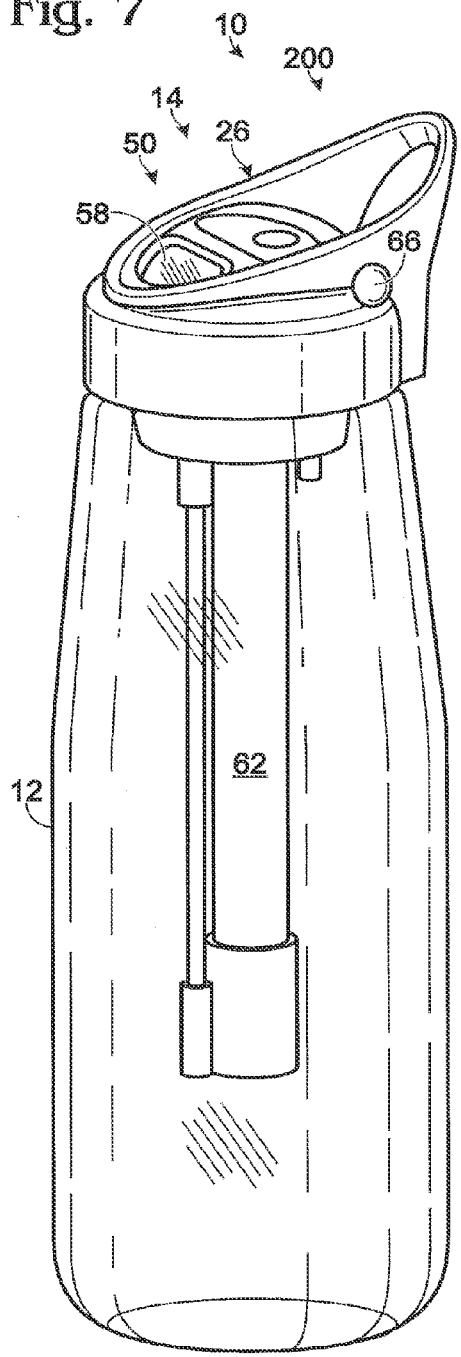
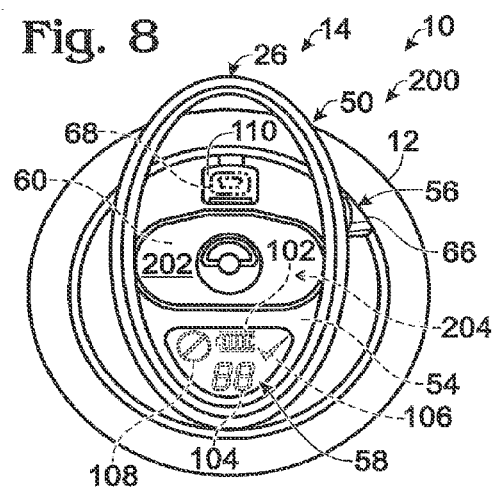
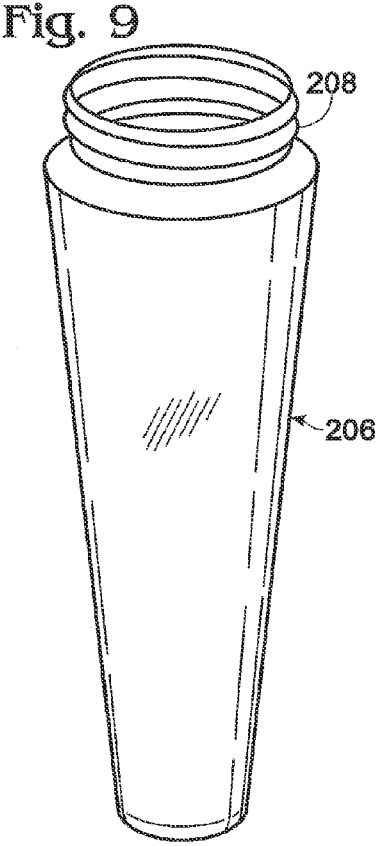

WATER PURIFYING DRINK CONTAINERS

CROSS-REFERENCE TO RELATED APPLICATIONS

This application claims the benefit of U.S. Non-Provisional application Ser. No. 13/424,235, titled UVC Water Purifier System and Method, filed on Mar. 19, 2012; U.S. Non-Provisional application Ser. No. 13/006,193, titled Water Purifying Drink Containers, filed on Jan. 13, 2011; U.S. Non-Provisional application Ser. No. 12/717,758, titled UV Water Purification Spigot, filed on Mar. 4, 2010; and also U.S. Pat. No. 7,550,089, titled Floating Ultraviolet Water Purification Device, filed on Aug. 10, 2006; U.S. Pat. No. 7,390,417, titled Portable Ultraviolet Water Purification System, filed on Dec. 3, 2004; and U.S. Provisional Application No. 60/554,665, titled Portable Ultraviolet Water Purification System, filed on Mar. 19, 2004; and, which are hereby incorporated by reference in their entirety.

FIELD OF THE INVENTION

The present disclosure relates generally to drink containers, and more particularly to drink containers that are configured to purify water or other drink liquids for consumption by a user.

BACKGROUND

For some time, people have recognized the need to stay hydrated. Conventionally, many individuals carry drink bottles or other containers that contain water or other potable beverages. However, in some situations it may be difficult for an individual to carry a large enough supply of potable water or other beverage for a specific activity, and it may be difficult for an individual to obtain potable water in certain locations. For example, backcountry enthusiasts, endurance athletes, military personnel, and others that travel in remote areas for extended periods of time and without access to clean drinking water may not be able to carry a sufficiently large supply of potable water or other beverage to maintain proper hydration. It is common for such persons to rely on water filters, which require time-consuming operation and may take up storage volume that is at a premium. It is also common for such persons to rely on water additives, such as iodine, to purify drinking water; however, such additives are often undesirable due to the taste they impart to the drinking water.

SUMMARY

The present disclosure is directed to drink containers that are configured to purify water or other drink liquids for consumption by a user. Drink containers according to the present disclosure include a liquid container, a cap assembly removably coupled to the liquid container, and a purification assembly that emits ultraviolet (UV) light in the germicidal spectrum to purify a volume of drink liquid held in the liquid container. In some embodiments, the purification assembly includes a UV bulb positioned within a recess of the cap assembly. In some embodiments, the UV bulb emits light in the visible spectrum in addition to UV light in the germicidal spectrum. In some such embodiments the drink container includes an indicator that becomes illuminated with visible light and thereby indicates to a user when the UV bulb is emitting UV light.

BRIEF DESCRIPTION OF THE DRAWINGS

FIG. 1 is a schematic illustration of drink containers according to the present disclosure.

FIG. 2 is an isometric view of an illustrative, non-exclusive example of a drink container according to the present disclosure.

FIG. 3 is a top plan view of the cap assembly of the drink container of FIG. 2.

FIG. 4 is a rear elevation view of the cap assembly of the drink container of FIG. 2.

FIG. 7 is an isometric view of another illustrative, non-exclusive example of a drink container according to the present disclosure.

FIG. 8 is a top plan view of the drink container of FIG. 7.

FIG. 9 is an isometric view of an optional protective sheath that may be used with the cap assembly of the drink container of FIG. 7.

DETAILED DESCRIPTION

Figure 5:
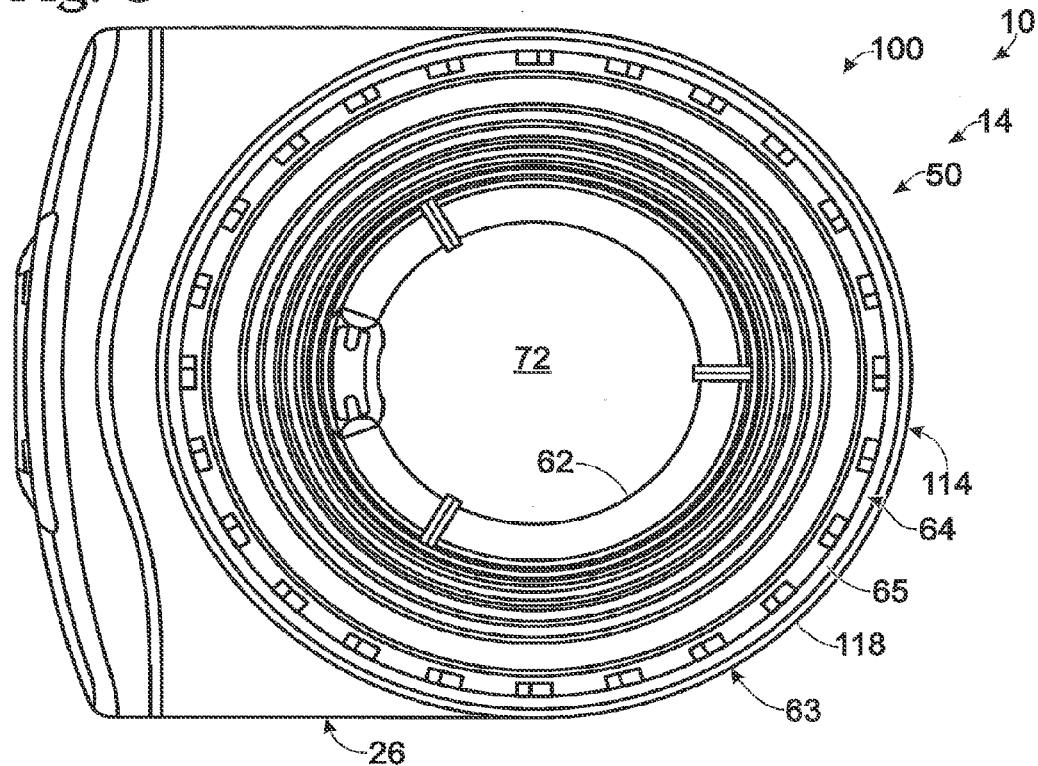
FIG. 5 is a bottom plan view of the cap assembly of the drink container of FIG. 2.

Drink containers according to the present disclosure are schematically illustrated in FIG. 1 and are indicated generally at 10. Drink containers 10 according to the present disclosure are designed to receive a volume of drink liquid (e.g., water), to selectively purify the volume of drink liquid, and to selectively dispense the volume of drink liquid to a user. Drink liquids other than water also may be received, purified, and dispensed by drink containers according to the present disclosure, including (but not limited to) sports drinks and other drink liquids, such as made by combining a concentrate or powder with water.

Drink containers 10 include a liquid container 12, a cap assembly 14 that includes at least a body 26, and a purification assembly 50 coupled to one of the liquid container and the body of the cap assembly. As discussed herein, the purification assembly is configured to selectively purify a volume of drink liquid, such as water, held in the liquid container, and thus enable safe consumption of the drink liquid by a user after purification of the drink liquid.

Liquid containers 12 according to the present disclosure are adapted to receive and hold or otherwise contain up to a predetermined volume of drink liquid 16 for selective purification and consumption by a user. Liquid containers 12 may be described as including a housing, or wall structure, 13 that defines the physical boundaries of the liquid container's internal compartment 20. Liquid containers 12 may include a neck 18 that defines an opening 19, through which drink liquid 16 may be selectively poured, or otherwise dispensed, into internal compartment 20 of the liquid container, and from which the drink liquid may be selectively dispensed from the internal compartment to a user, such as after the drink liquid is purified by purification assembly 50. It is within the scope of the present disclosure that neck 18 may (but is not required in all embodiments to) define the only opening through which drink liquid may be added to or removed from the liquid container. Additionally or alternatively, as discussed in more detail herein, it is within the scope of the present disclosure that when cap assembly 14 is operatively coupled to the liquid container, the selective dispensing of the drink liquid may be responsive to whether or not an optional mouthpiece assembly and/or valve of the cap assembly has been configured to a dispensing configuration, and in some embodiments, whether a mouthpiece portion of the mouthpiece assembly has been configured to an open configuration.

As used herein, "selective" and "selectively," when modifying an action, movement, configuration, or other activity of one or more components or characteristics of a drink container according to the present disclosure, means that the specified action, movement, configuration, or other activity is a direct or indirect result of user manipulation of an aspect of, or one or more components of, the drink container, and/or is a direct or indirect result of an action by another component of the drink container. Furthermore, as used herein, the terms "adapted" and "configured" mean that the corresponding component or element is designed and/or implemented to perform a particular function. Thus the use of the terms "adapted" and "configured" should not be construed to mean that the corresponding component or element is simply "capable" of performing or being modified or used to perform a given function, as opposed to being specifically designed or implemented to perform the function.

Liquid containers 12 may have any suitable shape and be formed from any suitable material or combination of materials to hold up to a predetermined volume of drink liquid. Illustrative, non-exclusive examples of suitable sizes, or capacities, of liquid containers 12 (i.e., volume of drink liquid 16 able to be received into a liquid container at one time) include 4 oz., 6 oz., 8 oz., 10 oz., 12 oz., 16 oz., 20 oz., 24 oz., 32 oz., 36 oz., 4-11 oz., 12-19 oz., 19-25 oz., 12-36 oz., 25-36 oz., and 10-70 oz. (with these illustrative examples referring to liquid (fluid) ounces of drink liquid that may be received at one time into an empty liquid container). It is within the scope of the present disclosure that liquid containers having different sizes, including sizes that are smaller than, larger than, or within the illustrative sizes and/or ranges presented above, may be used without departing from the scope of the present disclosure.

An illustrative, non-exclusive example of a material that may be used to construct liquid containers 12 according to the present disclosure includes the TRITAN™ copolyester polymer developed by Eastman Chemical Company. Other illustrative, non-exclusive examples of materials that may be suitable for construction of liquid containers according to the present disclosure include polycarbonate and metal, such as aluminum and stainless steel. Further illustrative, non-exclusive examples are disclosed in U.S. Pat. No. 7,533,783, the entire disclosure of which is hereby incorporated by reference. Liquid containers according to the present disclosure may be formed from a material, and/or may include an optional coating, that is not transmissive of ultraviolet (UV) light emitted by the purification assembly. In other words, liquid containers 12 may be constructed or otherwise formed or configured such that UV light emitted by purification assembly 50 is reflected by and/or otherwise does not pass through the walls, lower surface and/or other solid boundaries of the liquid container. As such, this emitted UV light may be contained within the internal compartment of the liquid container.

Liquid containers 12 may be (but are not required to be) rigid or at least semi-rigid, and may include a bottom surface 22 such that a liquid container may be generally self-supporting, or free-standing, when the bottom surface is placed upon a level surface. In such embodiments, drink containers 10 may be referred to as drink bottles. In some illustrative, non-exclusive embodiments, a liquid container 12 according to the present disclosure may be constructed of polyethylene or other material. Such an illustrative, non-exclusive example may permit opposing portions of the liquid container to be urged toward or even into contact with each other to reduce the volume of the liquid container and thereby aid in the dispensing of drink liquid 16 therefrom. In such an embodiment, the liquid container may be configured to return automatically to its prior configuration upon reduction of the pressure that was applied to urge the sides of the liquid container toward each other.

Cap assemblies 14 according to the present disclosure include at least a body 26, which additionally or alternatively may be referred to herein as a cap assembly body 26 and/or as a housing or cap assembly housing. Body 26 is adapted to be removably coupled to the neck 18 of a liquid container 12 to cover, or otherwise enclose, the opening 19 thereof, and therefore to permit selective and non-destructive removal and replacement (i.e., uncoupling and recoupling) of the cap assembly relative to the liquid container. For example, the cap assembly may be uncoupled from the liquid container to permit the liquid container to receive a volume of drink liquid, after which the cap assembly may be recoupled to the liquid container for purification of the drink liquid, as discussed herein, and for transport of drink container 10. Then, a user may selectively uncouple the cap assembly from the liquid container to selectively consume drink liquid from the liquid container.

Accordingly, drink containers according to the present disclosure may include a coupling assembly 28, with liquid container 12 including coupling structure 30 and cap assembly 14 including coupling structure 32. Coupling structures 30 and 32 are complimentarily configured to be selectively engaged to secure the liquid container and cap assembly together. In such an embodiment, neck 18 of the liquid container may include coupling structure 30, and body 26 of the cap assembly may include coupling structure 32. Coupling assembly 28 may be configured, or adapted, to provide a liquid-tight connection between the cap assembly and the liquid container. When such a connection is established between the cap assembly and the liquid container, the cap assembly may restrict, and in some embodiments prevent, liquid from being dispensed from the drink container. Illustrative, non-exclusive examples of coupling assembly 28 that may be incorporated into drink containers according to the present disclosure include (but are not limited to) threads, snap-fit arrangements, friction-fit arrangements, clasp arrangements, etc. Additionally or alternatively, the cap assembly may define a liquid passage 34, through which drink liquid may be selectively dispensed by a user when the cap assembly is coupled to the liquid container by the coupling assembly. Such embodiments are discussed in more detail herein.

As schematically illustrated in FIG. 1, drink containers 10 according to the present disclosure include a purification assembly 50 that is adapted to selectively purify drink liquid held in liquid container 12. In the illustrative, non-exclusive example schematically illustrated in FIG. 1, the purification assembly is illustrated as a component of, as embodied in, or as being coupled to, cap assembly 14. As schematically illustrated in dashed lines, it is also within the scope of the present disclosure, however, that the purification assembly 50, and/or component parts thereof, may additionally or alternatively be a component of, or be positioned on or within, or otherwise be partially or fully coupled to, the liquid container to form a liquid container assembly.

Purification assemblies 50 according to the present disclosure include an ultraviolet, or UV, light emitter 52, a controller 54, user controls 56, and a power supply 60. As schematically illustrated in FIG. 1, a purification assembly optionally may further include one or more of a user display 58, a detector 61, and/or an indicator 63, as discussed in more detail herein. FIG. 1 schematically illustrates the UV light emitter, the controller, the user controls, the power supply, and the optional user display and detector 61 as being operatively connected to each other; however, FIG. 1 is not interpreted as illustrating a wiring diagram associated with the purification assembly. Rather, the schematic illustration of purification assembly 50 graphically represents that the various components of the purification assembly may be connected to each other, may interact with each other, and/or otherwise collectively may form the purification assembly, or at least a portion thereof. For example, as an illustrative, non-exclusive example, the power supply may be adapted to power one or more of the UV light emitter, the controller, the user controls, the user display, and the detector; however, it is within the scope of the present disclosure that the power supply may be directly connected to the controller, which in turn controls and distributes the power to the various other components, for example.

UV light emitters 52 according to the present disclosure may take any suitable form and are configured to emit UV light of a wavelength that attacks the DNA of bacteria, viruses, and other microorganisms that may be found in water and/or that may be harmful if consumed by a person. Ultraviolet light having wavelengths in the range of 240-280 nanometers has proven effective, and UV light emitters 52 according to the present disclosure may be configured to emit UV light in the 240-280 nm range, including UV light having a wavelength of approximately 254 nm and UV light having a wavelength of approximately 260 nm. It is within the scope of the present disclosure that UV light emitters having different UV capabilities, including capabilities of emitting UV light with wavelengths that are shorter than, longer than, or within the illustrative wavelengths and/or range presented above, may be used without departing from the scope of the present disclosure. UV light having suitable wavelengths for the destruction of DNA of microorganisms may additionally or alternatively be referred to as UV light in the germicidal range, or spectrum, and/or UV light within, or at least overlapping, the ultraviolet C, or UV-C, range, or spectrum.

An illustrative, non-exclusive example of a UV light emitter 52 according to the present disclosure includes at least one UV bulb 62 adapted to emit UV light in the germicidal range. As schematically illustrated in FIG. 1, UV bulb 62 may be positioned within cap assembly 14 such that, when activated, the UV bulb emits light toward any drink liquid 16 held within internal compartment 20 of liquid container 12. The UV bulb may be positioned completely above the drink container, or at least above an uppermost level of drink liquid held by the drink container when the liquid container holds a predetermined volume of drink liquid, such as a predetermined capacity of the liquid container.

Additionally or alternatively, the UV bulb may be positioned, and the cap assembly and the liquid container may be shaped, or otherwise configured, so that an entire volume of drink liquid held within the drink container is within a line of sight of the UV bulb, for example, so that no portion of drink container 10 blocks, or otherwise creates a shadow on, any drink liquid held in the internal compartment of the liquid container.

Additionally or alternatively, a UV bulb according to the present disclosure may extend at least partially, or even completely, into the internal compartment of the drink liquid when the cap assembly is secured to the drink container. In some such embodiments, the UV bulb may contact the drink liquid when the cap assembly is secured to the drink container.

Additionally or alternatively, the UV bulb may be positioned and the cap assembly may be configured so that water is permitted to come into contact with one or more sides of the UV bulb when, for example, a user turns the drink container over and/or agitates the drink container with a volume of drink liquid held therein.

Additionally or alternatively, a cap assembly according to the present disclosure may include, or may be described as including, or defining, a recess 64 that generally faces the internal compartment of the liquid container and in which the UV bulb is at least partially, or even fully, positioned. Stated differently, when the cap assembly is coupled to the liquid container and the drink container is positioned in an upright orientation, in some embodiments, the UV bulb may not extend below, or beyond, a lower edge 65 of body 26 of the cap assembly, which may be described as being adjacent to the liquid container when the cap assembly is coupled to the liquid container. Additionally or alternatively, body 26 of the cap assembly may be described as including a lower portion 67 that defines the recess 64 and the lower edge 65 of the body.

Other configurations are also within the scope of the present disclosure, including, as mentioned, configurations in which the UV bulb is positioned on or within the liquid container.

In some embodiments, although not required, purification assemblies 50 according to the present disclosure may be configured so that UV bulb 62 may be selectively removed from the cap assembly so that a replacement UV bulb may be installed.

A UV bulb according to the present disclosure may be designed, engineered, or otherwise configured to be effective for use to purify drink liquid for a predetermined length of time, which also may be described as a predetermined length of actual use, predetermined number of purification cycles, etc., after which the effectiveness of the UV bulb in damaging the DNA of microorganisms may begin to decline and eventually may cease to be effective. Some UV bulbs according to the present disclosure may have characteristics that limit a number of cycles or a length, or period, of illumination time over its lifetime. Accordingly, controllers 54 according to the present disclosure may be configured, or programmed, to count, or otherwise track, the number of cycles and/or the total length of time a specific UV bulb has been activated. In such embodiments, the controller may control or restrict (or event prevent) the ability of a user to use the purification assembly after a predetermined number of cycles and/or length of time a UV bulb has been activated, such as based on an effectiveness of a UV light emitter, as discussed herein. As illustrative, non-exclusive examples, controller 54 may be configured to restrict activation of the UV light emitter upon the UV light emitter having been activated 1,000, 3,000, 5,000, 7,000, 9,000, 10,000, 12,000, 15,000, 17,000, or 20,000 cycles, between 5,000 and 20,000, between 7,500 and 12,500, or between 10,000 and 15,000 cycles, and/or at least 5,000, at least 7,000, at least 10,000, at least 12,000, at least 15,000, or at least 20,000 cycles. Additionally or alternatively, a controller may be configured to restrict activation of the UV light emitter after the emitter has been activated 200,000, 400,000, 600,000, 800,000, 1,000,000, 1,600,000, or 2,000,000 seconds, between 200,000 and 600,000, between 400,000 and 800,000, between 600,000 and 1,000, 000 seconds, between 1,000,000 and 2,000,000 seconds, and/ or at least 400,000, at least 800,000, at least 1,000,000, at least 1,600,000, or at least 2,000,000 seconds. Other numbers of cycles and lengths of time are also within the scope of the present disclosure, including numbers of cycles and lengths of time outside of or within the values and ranges enumerated herein.

Controller 54 may additionally or alternatively be configured to restrict, or prevent, use of the purification assembly (i.e., initiation of a purification cycle) if the battery or other power source contains insufficient power, or charge, to complete a purification cycle and/or if the battery or other power source has less than a threshold level of power, or charge. Other configurations are also within the scope of the present disclosure.

In some embodiments of purification assemblies 50 according to the present disclosure, the purification assembly (such as the UV emitter and/or UV bulb thereof) may be configured to only emit UV light (i.e., light in the ultraviolet spectrum) and/or to not emit light in the visible spectrum. Alternatively, purification assemblies 50 (such as the UV light emitters and/or UV bulbs thereof) according to the present disclosure may be adapted to selectively emit light in the visible spectrum together with light in the germicidal spectrum. Accordingly, depending on the configuration of a drink container, cap assembly, and/or liquid container, a user may be able to visually observe when the UV light emitter is emitting UV light due to the simultaneous emission of visible light by the purification assembly (or UV light emitter or UV bulb thereof).

A controller 54 according to the present disclosure additionally or alternatively may configure a user display 58 when present, to indicate associated information. For example, the user display may be configured to display the number of cycles having occurred and/or remaining for a UV bulb. Additionally or alternatively, the user display may be configured to indicate that the UV bulb is no longer effective for its intended purpose of purifying drink liquid. Additionally or alternatively, the user display may indicate that the purification assembly is no longer operational and may not be used to purify drink liquid. Other configurations are also within the scope of the present disclosure.

An illustrative, non-exclusive example of a suitable UV bulb 62 is a GTL3 germicidal lamp. As an illustrative, non-exclusive example, a GTL3 germicidal lamp may be rated at 3 Watts, 0.3 Amps, and 10.5.+−.2.5 Volts, with a UV output of 0.16 Watts and average life of approximately 3,000 hours. Other UV bulbs 62 also may be used without departing from the present disclosure, including cold cathode, mercury vapor, and fluorescent UV bulbs. As illustrative, non-exclusive examples, such bulbs may be configured to operate at approximately 3-4 Watts, 270 Volts, and/or 14 milli-Amps, although other operating parameters may be used and are within the scope of the present disclosure. Light emitting diodes (LEDs) that emit light in the germicidal spectrum are also within the scope of the term "UV bulb," as used herein, and UV light emitters according to the present disclosure may include one or more such UV LEDs. Examples of suitable LEDs include those developed by and available from Sensor Electronic Technology, Inc.

User controls 56 according to the present disclosure may take any suitable form, such that the controls are configured to permit a user to selectively activate the UV bulb and thereby purify a volume of water or other drink liquid contained in the drink container. For example, an illustrative, non-exclusive example of a user control that may be incorporated into purification assemblies 50 according to the present disclosure includes an on/off, or power, switch, or button, 66. For example, when button 66 is depressed, or otherwise activated by a user, the controller may be configured to activate the UV bulb for a predetermined period of time, such as a predetermined period of time that is effective for purifying a predetermined volume of drink liquid, such as based on the capacity of a particular liquid container 12 incorporated into a drink container 10 according to the present disclosure. The predetermined time that a UV bulb may be activated may be based at least in part on the time necessary to damage the DNA of a predetermined portion (e.g. >90%, >95%, >99%, >99.9%, and higher) of harmful microorganisms found in a typical volume of drink liquid to be purified. Illustrative, non-exclusive examples of predetermined times include times in the range of 45-120 seconds, including times of 45, 60, 75, 80, 90, 105, and 120 seconds. It is within the scope of the present disclosure that times greater than, less than, or within the illustrative range and times presented above, may be used without departing from the scope of the present disclosure.

Other controls also may be included, such as controls that are configured to enable a user to selectively navigate menus on user display 58, or to otherwise cause the user display to display information, such as to display the level of charge of power supply 60, the number of cycles having been performed by UV bulb 62, the number of cycles remaining for UV bulb 62, the ability to activate the UV bulb, etc. Other types and configurations of user controls also may be incorporated into purification assemblies and drink containers according to the present disclosure, and purification assemblies and drink containers are not limited to the specific user controls discussed herein.

As mentioned, user display 58 may be configured to display a variety of information to a user. For example, such information may include one or more of (i) the status of purification assembly 50 (e.g., on or off), (ii) the current state of charge of power supply 60, (iii) the current status of the power supply (e.g., whether the power supply is currently being charged), (iv) the time remaining until a full charge of the power supply (e.g., during recharging of a rechargeable power supply), (v) the number of cycles having been performed by UV bulb 62, (vi) the number of cycles remaining for UV bulb 62, (vii) the ability to activate the UV bulb, (viii) the time remaining during a purification cycle, (ix) the elapsed time of a purification cycle, (x) etc. An illustrative, non-exclusive example of a suitable user display for a purification assembly 50 according to the present disclosure is a liquid crystal display (LCD). As used herein a "cycle," such as a purification cycle and/or a cycle of a UV light emitter and/or a cycle of a UV bulb refers to a discrete, or defined, time period in which the purification assembly is actively emitting UV light in the germicidal spectrum.

Power supply 60 may take any suitable form and is configured to supply power at least to UV light emitter 52. Illustrative, non-exclusive examples of power supplies according to the present disclosure may include one or more of a battery or batteries, a rechargeable battery or batteries, and a solar cell or cells. Illustrative, non-exclusive examples of suitable rechargeable batteries include CR123 lithium batteries and ICR 17500 lithium-ion batteries.

When purification assembly 50 is configured to utilize rechargeable batteries, the purification assembly may additionally include a charging port 68 that is adapted to receive a charging probe, or plug, of a charging assembly. An illustrative, non-exclusive example of a suitable port may include a USB (universal serial bus) port, such as (but not limited to) a standard USB port, a mini-USB port, or a micro-USB port. When present, such a port may also be used to communicate with controller 54, for example, to program purification devices according to the present disclosure, to update software of purification devices according to the present disclosure, etc. When present, such a port also may be beneficial for recharging batteries of a power supply 60 from a portable electronic device, such as a laptop, phone, tablet, or similar device. That is, a recharging cord may be adapted to mate with port 68 on one end and may be adapted to mate with an appropriate port (e.g., a USB port) of an electronic device on the other end. Additionally or alternatively, a recharging cord may be adapted to mate with port 68 on one end and may be adapted to mate with an appropriate electrical socket on the other end, such as a standard North American 110 Volt socket or a standard European 220 Volt socket. Other configurations are also within the scope of the present disclosure. Additionally or alternatively, a recharging cord may include an international wall adapter that enables recharging of power supply 60 from more than one standard wall outlet.

Additionally or alternatively, optional charging port 68, when provided, together with controller 54 may permit and be configured for direct powering of the purification assembly, and thus the UV light emitter, from an external source, such as an electronic device, a solar panel, and/or an electric grid via a wall socket, without having to first recharge a battery or batteries. Additionally or alternatively, controller 54 may permit and be configured for simultaneous recharging of a battery or batteries and direct powering of the purification assembly from an external source.

As mentioned, a purification assembly according to the present disclosure may additionally or alternatively include an optional detector 61, such as a detector that is configured to detect one or more characteristics of a volume of drink liquid held in an associated liquid container. As an illustrative, non-exclusive example, a detector, when present, may detect, measure, and/or otherwise sense the UV-transmissivity of the drink liquid held in the liquid container. In such embodiments, the drink container may include one or more UV sensors 69 that are adapted to sense the UV-transmissivity of a volume of drink liquid held in the liquid container. Additionally or alternatively, an optional detector 61 according to the present disclosure may be adapted to detect, measure, and/or otherwise sense the germ content of the drink liquid held in the liquid container.

Accordingly, in embodiments that include a detector 61, including one or more of a UV sensor, the controller may be adapted (i) to select the length of time that the UV light emitter emits UV light, (ii) to selectively adjust the length of time that the UV light emitter emits UV light, (iii) to selectively increase the period of time that the UV light emitter emits UV light (iv) to select a power output of the UV light emitter, (v) to selectively adjust the power output of the UV light emitter, and/or (vi) to selectively increase the power output of the UV light emitter, based at least in part on the detected UV-transmissivity of the drink liquid and/or the germ content of the drink liquid.

In embodiments that include both a user display 58 and a detector 61, the user display may be configured to display information relating to the germ content and/or the UV-transmissivity of drink liquid held in the liquid container. In the context of germ content, this information may relate to the germ content of the drink liquid before and/or after the UV light emitter has emitted UV light in the germicidal spectrum to purify the drink liquid.

As schematically illustrated in FIG. 1, detectors 61 according to the present disclosure may be positioned within and/or may be coupled to the cap assembly 14. Additionally or alternatively, as schematically indicated in dash-dot lines in FIG. 1, a detector 61 may be positioned within and/or may be coupled to the liquid container 12. It is also within the scope of the present disclosure that a detector, while being coupled to, or otherwise a part of the cap assembly and purification assembly, may extend from the cap assembly into the liquid container (as schematically illustrated in dash-dot lines at 73) such as to a suitable position within the internal volume of the liquid container to effectively sense the UV-transmissivity and/or germ content of the drink liquid held in the liquid container.

Controllers 54 according to the present disclosure are configured to regulate or otherwise control operation of purification assemblies 50 of drink containers 10 according to the present disclosure. As discussed herein, this control may be implemented in one or more of a variety of suitable mechanisms or methods, such as to initiate operation, regulate operation, regulate duration, regulate intensity, discontinue operation, extend operation, and/or prevent operation of the purification assembly. A controller may take any suitable form and may include any suitable mechanism for actively controlling operation of, or aspects of, purification assemblies. For example, as an illustrative, non-exclusive example, a controller may include one or more of a computer chip and/or a circuit board with various components. A controller may include software and/or may be configured to be programmed with software. Additionally or alternatively, a controller may include storage media having executable instructions adapted to control the operation of, or aspects of, a purification assembly according to the present disclosure.

As discussed, controllers 54 according to the present disclosure may be configured to control such illustrative, non-exclusive aspects of purification assemblies 50 as (i) the distribution of power from the power supply to the various components of the purification assembly, (ii) the counting, or tracking, of the number of cycles a specific UV bulb has been activated, (iii) the counting, or tracking, of the length of time a specific UV bulb has been activated, (iv) the prevention of operation of the UV light emitter upon a predetermined number of cycles that a specific UV bulb has been activated and/or a predetermined length of time that a specific UV bulb has been activated, (v) the display of information on the user display, (vi) the charging of the power supply, (vii) the illumination of the UV bulb, (viii) the programming of the purification device, (ix) the updating of software associated with the purification device, (x) the detection of the UV-transmissivity of a volume of drink liquid held in the liquid container, (xi) the detection of the germ content of a volume of drink liquid held in the liquid container, (xii) etc. Other aspects of purification assemblies also may be controlled by controller 54, and controller 54 is not limited to being configured to perform the tasks enumerated herein.

Additionally or alternatively, a controller 54 according to the present disclosure may be adapted to restrict activation of the UV light emitter based at least in part on criteria associated with the effectiveness of the UV light emitter at a given moment in time, such as at a moment prior to a user initiating a purification cycle. As illustrative, non-exclusive examples, and as discussed herein, this criteria may include one or more of a state of charge of an associated power source, a power output of the UV light emitter, a germ content of the volume of drink liquid held in the liquid container, and/or a UV-transmissivity of the volume of drink liquid held in the liquid container. Other criteria associated with the effectiveness of the UV light emitter additionally or alternatively may be used by the controller to determine if restriction of the UV light emitter is appropriate in a given circumstance.

Still referring to FIG. 1, drink containers 10 according to the present disclosure may (but are not required to) include one or more of an optional UV-transmissive partition 70, an optional reflective surface 72, and an optional mouthpiece assembly 74.

UV-transmissive partition 70 additionally or alternatively may be referred to as a UV-transmissive shield and/or a UV-transmissive barrier 70. UV-transmissive partition 70, when provided, may be positioned between UV light emitter 52 and at least a substantial portion, if not all, of internal compartment 20 of liquid container 12 when cap assembly 14 is coupled to the liquid container. The UV-transmissive partition is constructed of a material that is configured to permit transmission of UV light in the germicidal range through the UV-transmissive partition. In some embodiments, the UV-transmissive partition is provided and configured to protect the UV light emitter from contact by a user or object. In some embodiments, the UV-transmissive partition is provided and configured to protect the UV light emitter from contact by drink liquid held in the liquid container.

In some embodiments, the UV-transmissive partition is constructed of a transparent, translucent, or otherwise UV-transmissive material through which UV light may pass, illustrative, non-exclusive examples of which include (but are not limited to quartz, soft glass, and polytetrafluoroethylene (PTFE, e.g., Teflon® material from E.I. du Pont De Nemours and Company). In some embodiments, the UV-transmissive partition may be mesh, or otherwise may include perforations, through which UV light in the germicidal spectrum may pass. Accordingly, in some such embodiments, the UV-transmissive partition may be constructed of a non-transparent material, a non-translucent material, and/or a material through which UV light may not pass, but which contains sufficient perforations or other apertures through which the UV light may pass.

Additionally or alternatively, the UV-transmissive partition may be configured to prevent drink liquid from the internal compartment of the liquid container from contacting the UV light emitter. Accordingly, the UV-transmissive partition may form a water-tight seal with body 26 of cap assembly 14. The cap assembly may additionally or alternatively include such illustrative, non-exclusive structure as a seal, an O-ring, an adhesive, etc. that forms a seal between the UV-transmissive partition and the body of the cap assembly.

Additionally or alternatively, the UV-transmissive partition may be configured to permit drink liquid from the internal compartment of the liquid container to contact the UV light emitter.

Additionally or alternatively, the UV-transmissive partition may be provided and configured to be concave, convex, or otherwise curved. This directing may include dispersing or concentrating the emitted UV light, such as depending upon such factors as the orientation of the UV bulb (or other UV light emitter), the UV purification assembly, the cap assembly, the liquid container, etc. In some embodiments, the UV-transmissive partition may be shaped, positioned, and/or otherwise optimized to direct UV light emitted by the UV light emitter to an entirety of the internal compartment of the liquid container, optionally including without any portion of the drink container blocking the UV light from illuminating all of any drink liquid held in the liquid container.

Optional reflective surface 72, when provided, may be positioned and configured to reflect light from the UV light emitter toward the internal compartment of the liquid container. Accordingly, when present, the optional reflective surface 72 may be positioned above the UV bulb, for example, in recess 64, when present, when the drink is container is in an upright orientation, as schematically illustrated in dashed lines in FIG. 1. Additionally or alternatively, the reflective surface may be positioned to reflect UV light, such as UV light that otherwise would not contact the drink liquid and/or certain portions thereof, and/or certain regions of the drink container or cap assembly, toward these portions of the drink liquid and/or these regions of the drink container or cap assembly. The reflective surface, when present, may be shaped to focus, spread, and/or otherwise direct the reflected UV light in an optimum configuration to ensure illumination of the entirety of the internal compartment of the liquid container in which drink liquid is held. Stated differently, the curvature of the reflective surface may be optimized to reflect light from the UV light emitter toward an entirety of the internal compartment. As illustrative, non-exclusive examples, the reflective surface may be parabolic, or at least generally parabolic, or arcuate. Additionally or alternatively, the reflective surface may be at least partially spherical. In FIG. 1, reflective surface 72 is optionally illustrated in a dash-dot line as having a convex configuration and extending at least partially into the region of the UV emitter 52, such as in an illustrative, non-exclusive example of a circular or semi-circular UV bulb 62; however, other configurations are also within the scope of the present disclosure, including (but not limited to) concave and flat configurations.

Reflective surface 72 may be defined by a layer of reflective material, such as (but not limited to) aluminum, stainless steel, biaxially-oriented polyethylene terephthalate (boPET, e.g., MYLAR® film), and other metals and non-metals. When provided, the reflective surface may have a greater reflectivity than the material from which body 26 of the cap assembly is constructed, and thereby reflect more of and absorb less of UV light in the germicidal range than if the reflective surface were not included.

As mentioned, some drink containers 10 according to the present disclosure may include a purification assembly 50 with an indicator 63, as schematically indicated in FIG. 1. Indicator 63, when present, may be adapted to indicate to a user when the UV light emitter is emitting UV light. The indicator may be adapted to emit a visual indication. For example, in some embodiments, the indicator may include a visible-light-transmissive portion 77 that is configured to become illuminated when the UV light emitter is emitting light in the visible spectrum (and into contact with portion 77. In some embodiments, the visible-light-transmissive portion may be described as a window. As mentioned, some UV light emitters and UV bulbs according to the present disclosure may be adapted to emit light in both of the germicidal spectrum and the visible spectrum. As illustrative, non-exclusive examples, one or more portions of the cap assembly and/or the liquid container may include a transparent portion, or window, and/or a translucent portion, or window. In examples that include a translucent portion, the translucent portion may be described as being illuminated, or as glowing, when the UV light emitter is emitting both UV light and visible light.

In some embodiments, the lower portion 67 of the cap assembly body 26 may include the indicator 63, or at least the visible-light-transmissive portion 77 of the indicator. For example, the visible-light-transmissive portion may define a ring around the cap assembly, and adjacent to opaque portions of the cap assembly, such that it becomes illuminated, or glows, when the UV light emitter is emitting light in the visible spectrum. Additionally or alternatively, the liquid container may include a visible-transmissive portion, such as a ring, adjacent to opaque portions of the liquid container, such that it becomes illuminated, or glows, when the UV light emitter is emitting light in the visible spectrum.

Optional mouthpiece assembly 74, when present, may provide structure for a user to selectively dispense drink liquid from the drink container without removal of the cap assembly. That is, in some embodiments, the selective dispensing of drink liquid from the drink container may be responsive to whether or not an optional mouthpiece assembly of the cap assembly has been configured to a dispensing configuration, and in some embodiments, whether a mouthpiece portion 78 of the mouthpiece assembly has been configured to an open configuration. When a mouthpiece assembly is provided, the cap assembly defines liquid passage 34, through which drink liquid may be selectively dispensed by a user. Illustrative, non-exclusive examples of suitable mouthpiece assemblies, and associated components, are disclosed in U.S. Pat. No. 7,533,783 and U.S. Patent Application Publication No. 2010/0181329, the disclosures of which are hereby incorporated by reference. In some embodiments, when an optional mouthpiece assembly 74 is present, an optional straw 80 may be provided and operatively coupled to the liquid passage 34 and extend into the liquid container, as schematically illustrated in FIG. 1. As indicated herein, it is also within the scope of the present disclosure that the cap assembly may not include a mouthpiece assembly, drink spout, or other mechanism for selectively dispensing drink liquid through the cap assembly.

Turning now to FIGS. 2-9, illustrative, non-exclusive examples of drink containers 10 according to the present disclosure and various component parts thereof are illustrated. Where appropriate, the reference numerals from the schematic illustration of FIG. 1 are used to designate corresponding parts of drink containers 10 according to the present disclosure; however, the examples of FIGS. 2-9 are non-exclusive and are not intended to limit the present disclosure to the illustrated embodiments. That is, neither drink containers 10, nor various component parts thereof, are limited to the specific embodiments disclosed and illustrated in FIGS. 2-9. Accordingly, drink containers 10 according to the present disclosure may incorporate any number of the various aspects, configurations, characteristics, properties, etc. illustrated in the embodiments of FIGS. 2-9, in the embodiments of FIG. 1, as well as variations thereof and without requiring the inclusion of all such aspects, configurations, characteristics, properties, etc. For the purpose of brevity, each previously discussed component part, or variant thereof, may not be discussed again with respect to FIGS. 2-9; however, it is within the scope of the present disclosure that the previously discussed features, materials, variants, etc. may be utilized with the illustrated embodiments of FIGS. 2-9. Similarly, it is also within the scope of the present disclosure that all of the component parts, and portions thereof, that are illustrated in FIGS. 2-9 are not required to all embodiments according to the present disclosure.

An illustrative, non-exclusive example of a drink container 10 according to the present disclosure is illustrated in FIG. 2 and is indicated generally at 100. The cap assembly 14 of drink container 100 is illustrated in more detail in FIGS. 3-6. Drink container 100 includes a liquid container 12 and a cap assembly 14 with a purification assembly 50. That is, the purification assembly of drink container 100 is a component of the cap assembly and may be described as being coupled to body 26 of the cap assembly. This coupled configuration may, but is not required to, include permanent or otherwise integral assembly between the purification assembly and the cap assembly.

As illustrated in FIG. 3, the purification assembly of drink container 100 includes a user display 58 and an on/off button 66. As illustrated, the user display is configured to display such illustrative, non-exclusive information as battery charge 102, elapsed or remaining time 104 of a purification cycle, a check mark (or another symbol, text, or indicia) 106 to indicate to a user that a purification cycle is complete, and a crossed circle (or another symbol, text, or indicia) 108 to indicate to a user that a purification cycle did not properly purify the drink liquid or otherwise complete a purification cycle. As discussed herein, other information also may be displayed by a user display 58 according to the present disclosure.

As seen in FIG. 4, the cap assembly of drink container 100 includes a removable protective cover 110 that is configured to selectively cover a charging port 68, in the form of a mini-USB port, such as when the charging port is not being used. Protective cover 110 thus may be described as being configured to restrict liquids from entering the charging port when the protective cover is in a closed configuration.

Figure 6:
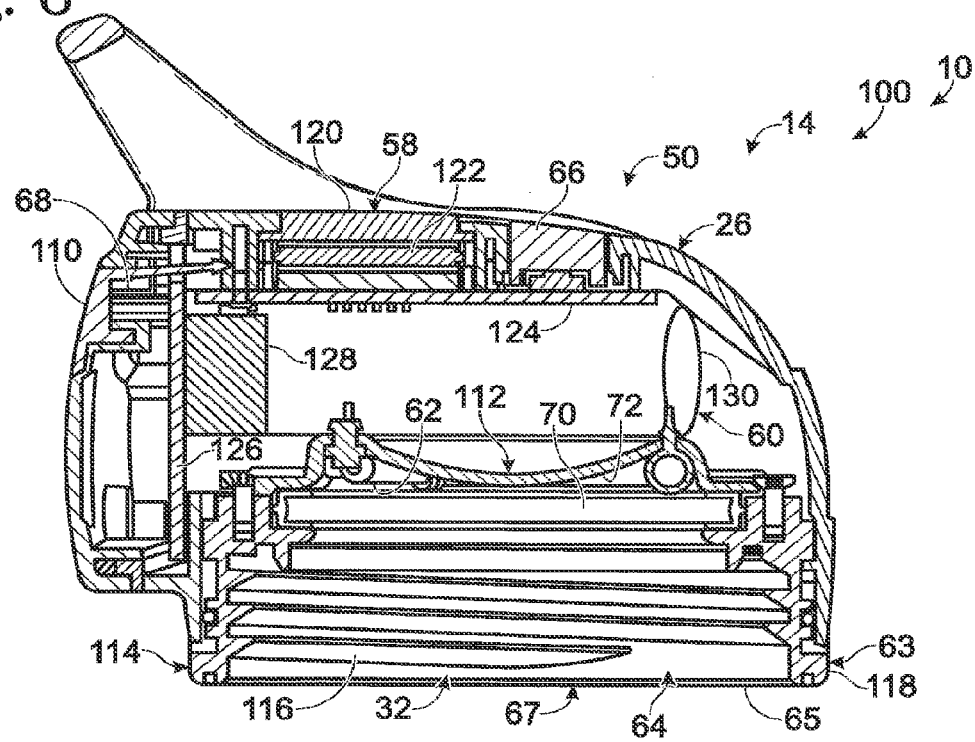
FIG. 6 is a side cross-sectional view of the cap assembly of the drink container of FIG. 2, taken along the line 6-6 in FIG. 3.

Turning now to FIGS. 5-6, it can be seen that drink container 100 is an example of a drink container 10 in which the body of the cap assembly defines a recess 64 with a UV bulb 62 positioned therein. The illustrative, non-exclusive example of the UV bulb is circular, and does not extend below, or beyond, the lower edge 65 of the body of the cap assembly. Other shapes and configurations of UV bulbs are also within the scope of the present disclosure, including (but not limited to) U-shaped bulbs.

As perhaps best seen in FIG. 6, the cap assembly of drink container 100 includes a UV-transmissive partition 70 that is constructed of quartz and that forms a water-tight seal with the body of the cap assembly. Accordingly, the UV-transmissive partition restricts liquid from an associated liquid container from directly contacting the UV bulb.

The cap assembly of drink container 100 further includes a reflector 112 that defines optional reflective surface 72. Reflector 112 is constructed of aluminum and is configured in a partially spherical shape to direct light from the UV bulb to the internal compartment of the associated liquid container.

The cap assembly of drink container 100 further includes a threaded insert, or threaded portion, 114 that defines coupling structure 32. That is, the coupling structure 32 of the cap assembly of drink container 100 includes threads 116 that are configured to mate with corresponding threads of a liquid container. In the illustrative, non-exclusive example of drink container 100, the threaded insert is constructed of a translucent material and defines the lower portion 67 of the cap assembly's body, with a lower most portion 118 defining an outer ring of the cap assembly that is visible when the cap assembly is coupled to a liquid container. Accordingly, drink container 100 is an example of a drink container 10 that includes an indicator 63 that defines an illuminated, or glowing, ring around the cap assembly when the UV light emitter is emitting light in the visible spectrum. Other configurations of indicators, including indicators that do not define an illuminated ring are also within the scope of the present disclosure and are not limited to being defined by a threaded insert of a cap assembly.

Still referring to FIG. 6, the user display 58 of drink container 100 includes a transparent protective window 120 positioned over a liquid crystal display (LCD) 122. The purification assembly 50 of drink container 100 also includes a printed circuit board (PCB) 124 associated with the user display, and a PCB 126 associated with a transformer 128. Schematically illustrated in FIG. 6 is one of two batteries 130 that serve as the power source 60 of the purification assembly.

Another illustrative, non-exclusive example of a drink container 10 according to the present disclosure is illustrated in FIGS. 7-8, and is indicated generally at 200. Drink container 200 is another example of a drink container 10 in which the purification assembly is integral to the cap assembly 14 of the drink container; however, in contrast to drink container 100 illustrated in FIGS. 2-6, the purification assembly of drink container 200 includes a UV bulb 62 that extends into the internal compartment of the liquid container. Accordingly, the UV bulb of drink container 200 is positioned and configured to extend into the drink liquid that is held in the liquid container.

As seen in FIG. 8, and similar to drink container 100, the cap assembly of drink container 200 includes a user display 58 and an on/off button 66. The user display of drink container 200 is configured to display information as to battery charge 102, elapsed or remaining time 104 of a purification cycle, a check mark 106 to indicate to a user that a purification cycle is complete, and a crossed circle 108 to indicate to a user that a purification cycle did not properly purify the drink liquid and/or complete a purification cycle. As discussed, other symbols, text, indicia, etc. may be used in place of the illustrative, non-exclusive indicators depicted in FIG. 8 (and elsewhere herein).

The cap assembly 14 of drink container 200 also includes a protective cover 110 that covers charging port 68 and that is configured to restrict liquids from entering the charging port when the protective cover is in a closed configuration. The cap assembly of drink container 200 also includes a water-tight cover 202 to a battery compartment 204, in which a power supply 60 in the form of rechargeable or other batteries is selectively positioned.

FIG. 9 illustrates an optional protective sheath 206 that is adapted to mate with the cap assembly 14 of drink container 200 and to enclose the UV bulb therein. Accordingly, when the purification assembly of drink container 200 is not being used to purify a volume of drink liquid, such as after a user has purified a volume of drink liquid, cap assembly 14 of drink container 200 may be coupled to sheath 206 so that UV bulb 62 is housed, or stored therein. As illustrated, the protective sheath includes threads 208 that are adapted to mate with the corresponding threads of the cap assembly. Additionally, when an optional sheath is provided, an optional auxiliary cap also may be provided, such as to be coupled to the neck of the liquid container and thereby close the opening of the liquid container 12 when the cap assembly is being stored with the protective sheath. Such optional accessories may be used with other cap assemblies and/or drink containers according to the present disclosure, including drink containers 100 according to the present disclosure. In the context of a drink container 100, because the purification assembly includes a UV bulb that is positioned within a recess of the cap assembly's body and that does not extend beyond the lower edge of the cap assembly body, an optional protective sheath simply may be a threaded cover that is adapted to mate with the threads of the cap assembly of drink container 100. That is, an optional sheath for a drink container 100 according to the present disclosure may more appropriately be described as a cap assembly cover.

Figure 10:
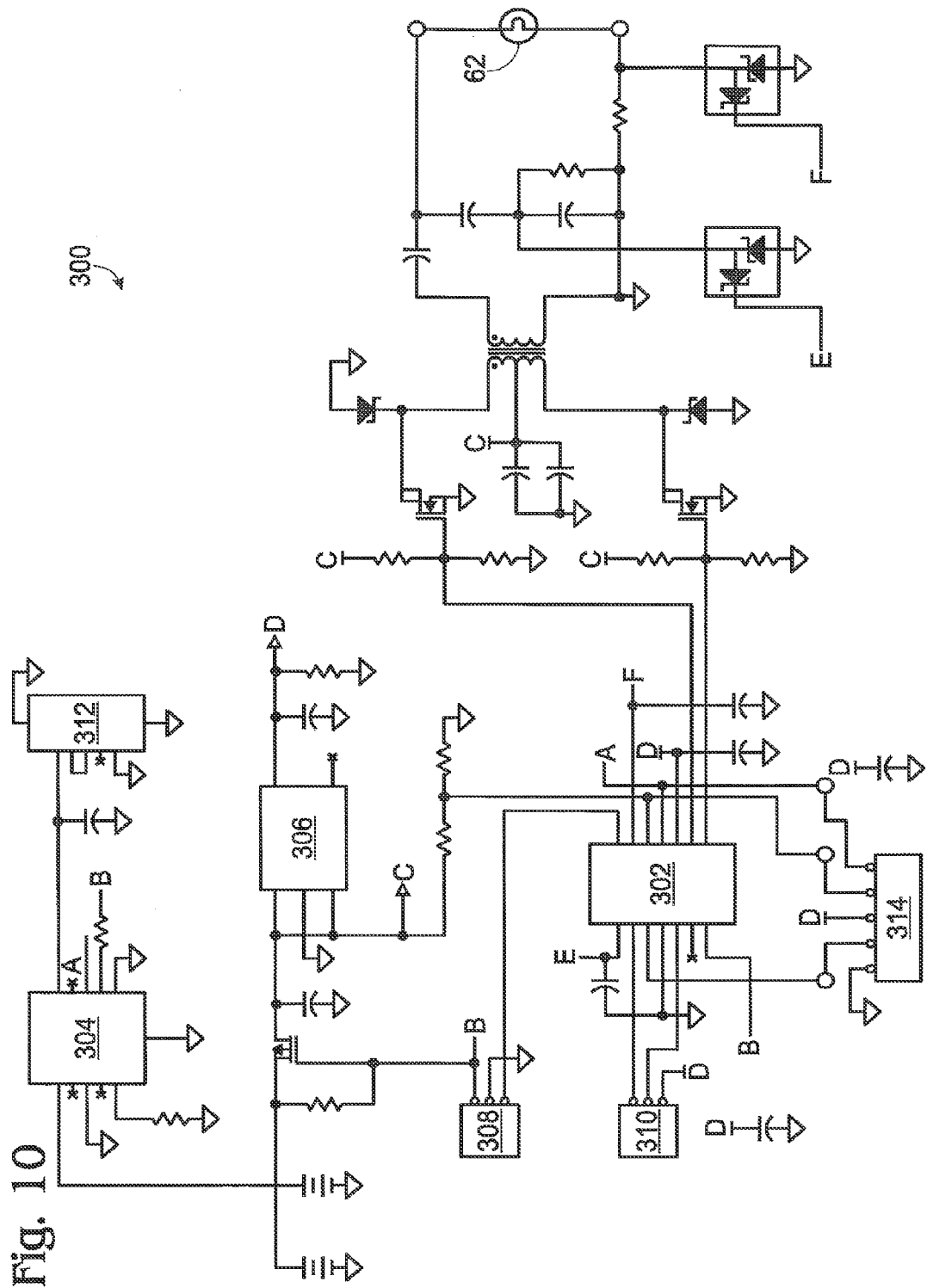
FIG. 10 is a wiring diagram schematically illustrating an illustrative, non-exclusive example of a purification assembly of a drink container according to the present disclosure.

Finally, turning to FIG. 10, an illustrative, non-exclusive example of a wiring diagram 300 that may be suitable for purification assemblies 50 and drink containers 10 according to the present disclosure is schematically presented. Diagram 300 may additionally or alternatively be described as a lamp driver circuit 300, such as corresponding to a UV bulb 62 according to the present disclosure.

As indicated, lamp driver circuit 300 includes a main microprocessor 302 for controlling operation of the purification assembly, a battery charging microprocessor 304 for controlling efficient and safe charging of the associated batteries, a low dropout voltage regulator 306 for maintaining stability of the circuit's voltage, connectors 308, 310 for interfacing with an associated user display 58 according to the present disclosure, a connector 312 associated with a charging port 68 according to the present disclosure, and a connector 314 for taking test measurements of the circuit. In the illustrated diagram, connections between respective positions in the circuit are schematically represented with letters A-F, respectively. Other lamp driver circuits are also within the scope of the present disclosure, and drink containers 10 and purification assemblies 50 according to the present disclosure are not limited to using the illustrated circuit of FIG. 10.

The following lettered paragraphs represent illustrative, non-exclusive ways of describing inventions according to the present disclosure.

A A drink container, comprising:

a liquid container having a neck with an opening and having an internal compartment sized to hold a volume of drink liquid;

a cap assembly removably coupled to the neck of the liquid container and adapted to restrict dispensing of drink liquid from the internal compartment of the liquid container through the opening, wherein the cap assembly includes a body, wherein the body includes a lower portion that defines a lower edge that is adjacent to the liquid container; and a purification assembly coupled to one of the liquid container and the body of the cap assembly, wherein the purification assembly includes an ultraviolet (UV) light emitter adapted to selectively emit UV light in the germicidal spectrum for a predetermined period of time and to thereby purify a volume of drink liquid held in the internal compartment of the liquid container.

A1 The drink container of paragraph A, wherein the purification assembly is coupled to the body of the cap assembly.

A1.1 The drink container of paragraph A1, wherein the lower portion of the cap assembly defines a recess facing the internal compartment of the liquid container when the cap assembly is coupled to the neck of the liquid container, wherein the UV light emitter includes a UV bulb positioned within the recess.

A1.1.1 The drink container of paragraph A1.1, wherein the UV bulb does not extend into the drink liquid when a predetermined volume of drink liquid is held in the internal compartment of the liquid container, wherein the predetermined volume is equal to a predetermined liquid capacity of the liquid container.

A1.1.2 The drink container of any of paragraphs A1.1-A1.1.1, wherein the UV bulb does not extend beyond the lower edge of the body of the cap assembly.

A1.2 The drink container of any of paragraphs A1-A1.1.2, wherein the cap assembly further includes a reflective surface positioned to reflect light from the UV light emitter toward the internal compartment of the liquid container.

A1.2.1 The drink container of paragraph A1.2, wherein the reflective surface is configured to reflect light from the UV light emitter toward an entirety of the internal compartment of the liquid container.

A1.2.2 The drink container of any of paragraphs A1.2-A1.2.1, wherein the lower portion of the cap assembly defines a recess facing the internal compartment of the liquid container when the cap assembly is coupled to the neck of the liquid container, wherein the UV light emitter includes a UV bulb positioned within the recess, and wherein the UV bulb is positioned between the reflective surface and the lower edge.

A1.2.3 The drink container of any of paragraphs A1.2 A1.2.2, wherein a curvature of the reflective surface is optimized to reflect light from the UV light emitter toward an entirety of the internal compartment.

A1.2.4 The drink container of any of paragraphs A1.2-A1.2.2, wherein the reflective surface is at least one of partially parabolic and partially spherical.

A1.3 The drink container of any of paragraphs A1-A1.2.4, wherein the cap assembly further includes a UV-transmissive partition positioned between the UV light emitter and at least a substantial portion of the internal compartment of the liquid container when the cap assembly is coupled to the neck of the liquid container.

A1.3.1 The drink container of paragraph A1.3, wherein the UV-transmissive partition includes one or more of quartz, soft glass, polytetrafluoroethylene, and/or other UV-transmissive material.

A1.3.2 The drink container of any of paragraphs A1.3-A1.3.1, wherein the UV-transmissive partition forms a watertight seal with the body of the cap assembly and prevents drink liquid from the internal compartment of the liquid container from contacting the UV light emitter.

A1.3.3 The drink container of any of paragraphs A1.3 A1.3.2, wherein the UV-transmissive partition is concave, convex, or otherwise curved.

A1.3.4 The drink container of any of paragraphs A1.3 A1.3.2, wherein the UV-transmissive partition is concave, convex, or otherwise curved, and UV light emitted by the UV light emitter may propagate to an entirety of the internal compartment of the liquid container without any portion of the drink container blocking the UV light from illuminating all of any drink liquid held in the internal compartment.

A1.3.5 The drink container of any of paragraphs A1.3 A1.3.2, wherein the UV-transmissive partition is configured to direct, diffuse, and/or spread UV light emitted by the UV light emitter to an entirety of the internal compartment of the liquid container.

A1.3.6 The drink container of any of paragraphs A1.3-A1.3.2, wherein the UV-transmissive partition is configured to direct, diffuse, and/or spread UV light emitted by the UV light emitter to an entirety of the internal compartment of the liquid container without any portion of the drink container blocking the UV light from illuminating all of any drink liquid held in the internal compartment.

A1.3.7 The drink container of any of paragraphs A1.3-A1.3.2, wherein the UV-transmissive partition is optimized to direct UV light emitted by the UV light emitter to an entirety of the internal compartment of the liquid container.

A1.3.8 The drink container of any of paragraphs A1.3-A1.3.2, wherein the UV-transmissive partition is optimized to direct UV light emitted by the UV light emitter to an entirety of the internal compartment of the liquid container without any portion of the drink container blocking the UV light from illuminating all of any drink liquid held in the internal compartment.

A1.3.9 The drink container of any of paragraphs A1.3-A1.3.8, wherein the UV-transmissive partition is configured to permit drink liquid from the internal compartment of the liquid container to contact the UV light emitter.

A2 The drink container of any of paragraphs A-A1.3.9, wherein the drink container is configured such that the UV light emitter selectively emits the UV light to the entirety of the internal compartment of the liquid container.

A3 The drink container of any of paragraphs A-A2, wherein the drink container is configured such that the UV light emitter selectively emits the UV light to the entirety of the internal compartment of the liquid container without any portion of the drink container blocking the UV light from illuminating all of any drink liquid held in the internal compartment.

A4 The drink container of any of paragraphs A-A2, further comprising:
an indicator adapted to indicate to a user when the UV light emitter is emitting UV light.

A4.1 The drink container of paragraph A4, wherein the UV light emitter is further adapted to selectively emit light in the visible spectrum for the predetermined period of time, and wherein the indicator includes a visible-light-transmissive portion that is configured to become illuminated when the UV light emitter is emitting light in the visible spectrum.

A4.1.1 The drink container of paragraph A4.1, wherein the visible-light-transmissive portion includes a transparent portion.

A4.1.2 The drink container of paragraph A4.1.1, wherein the visible-light-transmissive portion includes a translucent portion.

A4.2 The drink container of any of paragraphs A4-A4.1.2, wherein the liquid container includes the indicator.

A4.3 The drink container of any of paragraphs A4.1.2, wherein the cap assembly includes the indicator.

A4.3.1 The drink container of paragraph A4.3, wherein the lower portion of the body of the cap assembly includes the indicator, wherein at least a portion of the lower portion defines an illuminated ring around the cap assembly when the UV light emitter is emitting light in the visible spectrum.

A4.3.1.1 The drink container of paragraph A4.3.1, wherein the cap assembly includes a threaded insert that includes threads adapted to mate with corresponding threads of the liquid container, wherein the threaded insert includes the lower portion of the body of the cap assembly.

A5 The drink container of any of paragraphs A-A4.3.1.1, wherein the purification assembly includes a controller adapted to control operation of the UV light emitter.

A5.1 The drink container of paragraph A5, wherein the controller is adapted to track the number of cycles that the UV light emitter has been selectively activated.

A5.1.1 The drink container of paragraph A5.1, wherein the controller is further adapted to restrict activation of the UV light emitter upon the UV light emitter having been activated a predetermined number of cycles.

A5.1.1.1 The drink container of paragraph A5.1.1, wherein the predetermined number of cycles is at least 5,000 cycles.

A5.1.1.2 The drink container of paragraph A5.1.1, wherein the predetermined number of cycles is at least 10,000 cycles.

A5.1.1.3 The drink container of paragraph A5.1.1, wherein the predetermined number of cycles is at least 15,000 cycles.

A5.1.1.4 The drink container of paragraph A5.1.1, wherein the predetermined number of cycles is at least 20,000 cycles.

A5.2 The drink container of any of paragraphs A5-A5.1.1.4, wherein the controller is adapted to track the length of time that the UV light emitter has emitted UV light.

A5.2.1 The drink container of paragraph A5.2, wherein the controller is further adapted to restrict activation of the UV light emitter upon the UV light emitter having emitted UV light for a predetermined length of time.

A5.2.1.1 The drink container of paragraph A5.2.1, wherein the predetermined length of time is at least 400,000 seconds.

A5.2.1.2 The drink container of paragraph A5.2.1, wherein the predetermined length of time is at least 800,000 seconds.

A5.2.1.3 The drink container of paragraph A5.2.1, wherein the predetermined length of time is at least 1,600,000 seconds.

A5.3 The drink container of any of paragraphs A5-A5.2.1.3, wherein the controller is adapted to restrict activation of the UV light emitter based at least in part on criteria associated with the effectiveness of the UV light emitter at a given moment in time.

A5.3.1 The drink container of paragraph A5.3, wherein the criteria includes one or more of a state of charge of an associated power source, a power output of the UV light emitter, a germ content of the volume of drink liquid held in the internal compartment of the liquid container, and a UV-transmissivity of the volume of drink liquid held in the internal compartment of the liquid container.

A5.4 The drink container of any of paragraphs A5-A5.3.1, wherein the purification assembly includes a power source.

A5.4.1 The drink container of paragraph A5.4, wherein the controller is adapted determine a potential output of the power source and to restrict activation of the UV light emitter if the power source does not have sufficient output to activate the UV light emitter for the predetermined period of time to purify the volume of drink liquid held in the internal compartment of the liquid container.

A5.4.2 The drink container of any of paragraphs A5.4-A5.4.1, wherein the power source includes one or more rechargeable batteries.

A6 The drink container of any of paragraphs A-A5.4.2, wherein the purification assembly includes a user control positioned to receive input from a user of the drink container and configured to permit a user to selectively activate the UV light emitter.

A7 The drink container of any of paragraphs A-A6, wherein the purification assembly includes a user display positioned to display information to a user of the drink container.

A8 The drink container of any of paragraphs A-A7, wherein the purification assembly includes one or more rechargeable batteries and a charging port adapted to receive a charging cord.

A8.1 The drink container of paragraph A8, wherein the charging port includes a USB port.

A9 The drink container of any of paragraphs A-A8.1, wherein the purification assembly is adapted to measure and/or detect a UV-transmissivity of the volume of drink liquid held in the internal compartment of the liquid container.

A9.1 The drink container of paragraph A9, wherein the drink container further comprises:

a UV sensor adapted to sense the UV-transmissivity of the volume of drink liquid held in the internal compartment of the liquid container.

A9.1.1 The drink container of paragraph A9.1, wherein the UV sensor is positioned within the liquid container.

A9.1.2 The drink container of any of paragraphs A9.1-A9.1.1, wherein the UV sensor is coupled to the cap assembly.

A9.1.3 The drink container of any of paragraphs A9.1-A9.1.1, wherein the UV sensor is coupled to the liquid container.

A9.2 The drink container of any of paragraphs A9-A9.1.3, wherein the purification assembly is further adapted to select the predetermined period of time based at least in part on the UV-transmissivity of the volume of drink liquid held in the internal compartment of the liquid container.

A9.3 The drink container of any of paragraphs A9-A9.2, wherein the purification assembly is further adapted to select a power output of the UV light emitter based at least in part on the UV-transmissivity of the volume of drink liquid held in the internal compartment of the liquid container.

A9.4 The drink container of any of paragraphs A9-A9.3, wherein the purification assembly is further adapted to selectively adjust the power output of the UV light emitter based at least in part on the UV-transmissivity of the volume of drink liquid held in the internal compartment of the liquid container.

A9.5 The drink container of any of paragraphs A9-A9.4, wherein the purification assembly is further adapted to selectively increase the power output of the UV light emitter based at least in part on the UV-transmissivity of the volume of drink liquid held in the internal compartment of the liquid container.

A9.6 The drink container of any of paragraphs A9-A9.5, wherein the purification assembly is further adapted to selectively adjust the predetermined period of time based at least in part on the UV-transmissivity of the volume of drink liquid held in the internal compartment of the liquid container.

A9.7 The drink container of any of paragraphs A9-A9.6, wherein the purification assembly is further adapted to selectively increase the predetermined period of time based at least in part on the UV-transmissivity of the volume of drink liquid held in the internal compartment of the liquid container.

A10 The drink container of any of paragraphs A-A9.7, wherein the purification assembly is adapted to measure and/or detect a germ content of the volume of drink liquid held in the internal compartment of the liquid container.

A10.1 The drink container of paragraph a10, wherein the drink container further comprises: [0149] a germ sensor adapted to sense the germ content of the volume of drink liquid held in the internal compartment of the liquid container.

A10.1.1 The drink container of paragraph A10.1, wherein the sensor is positioned within the liquid container.

A10.1.2 The drink container of any of paragraphs A10.1-A10.1.1, wherein the sensor is coupled to the cap assembly.

A10.1.3 The drink container of any of paragraphs A10.1-A10.1.1, wherein the sensor is coupled to liquid container.

A10.2 The drink container of any of paragraphs A10-A10.1.3, wherein the purification assembly is further adapted to select the predetermined period of time based at least in part on the germ content of the volume of drink liquid held in the internal compartment of the liquid container.

A10.3 The drink container of any of paragraphs A10-A10.2, wherein the purification assembly is further adapted to select a power output of the UV light emitter based at least in part on the germ content of the volume of drink liquid held in the internal compartment of the liquid container.

A 10.4 The drink container of any of paragraphs A10-A10.3, wherein the purification assembly is further adapted to selectively adjust the power output of the UV light emitter based at least in part on the germ content of the volume of drink liquid held in the internal compartment of the liquid container.

A 10.5 The drink container of any of paragraphs A10-A10.4, wherein the purification assembly is further adapted to selectively increase the power output of the UV light emitter based at least in part on the germ content of the volume of drink liquid held in the internal compartment of the liquid container.

A10.6 The drink container of any of paragraphs A10-A10.5, wherein the purification assembly is further adapted to selectively adjust the predetermined period of time based at least in part on the germ content of the volume of drink liquid held in the internal compartment of the liquid container.

A10.7 The drink container of any of paragraphs A10-A10.6, wherein the purification assembly is further adapted to selectively increase the predetermined period of time based at least in part on the germ content of the volume of drink liquid held in the internal compartment of the liquid container.

A 10.8 The drink container of any of paragraphs A10-A10.7, wherein the purification assembly includes a user display positioned to display information to a user of the drink container, wherein the information relates to the germ content of the drink liquid held in the internal compartment of the liquid container before and/or after the UV light emitter has emitted UV light in the germicidal spectrum for the predetermined period of time.

A11 The drink container of any of paragraphs A-A10.8, wherein the cap assembly defines a liquid passage, through which drink liquid may be selectively dispensed from the liquid container.

A11.1 The drink container of paragraph A11, wherein the cap assembly further includes a mouthpiece in fluid communication with the liquid passage, wherein the mouthpiece is configured to selectively dispense the drink liquid without removal of the cap assembly from the liquid container.

A11.1.1 The drink container of paragraph A11.1, wherein the mouthpiece includes a bite-actuated mouthpiece.

B A drink container, comprising:
a liquid container having a neck with an opening and having an internal compartment sized to hold a volume of drink liquid;
a cap assembly removably coupled to the neck of the liquid container and adapted to restrict dispensing of drink liquid from the internal compartment of the liquid container, wherein the cap assembly includes a body; and
means for purifying drink liquid held in the internal compartment of the liquid container.

B1 The drink container of paragraph B, wherein the body defines a recess facing the internal compartment of the liquid container when the cap assembly is coupled to the liquid container, wherein the means for purifying includes a UV bulb positioned within the recess, wherein the UV bulb is adapted to selectively emit UV light in the germicidal spectrum for a predetermined period of time and to thereby purify a volume of drink liquid held in the internal compartment of the liquid container.

B2 The drink container of any of paragraphs B-B1, wherein the means for purifying includes the purification assembly of any of paragraphs A-A10.8.

B3 The drink container of any of paragraphs B-B2, further comprising any of the structure of any of paragraphs A-A11.1.1.

C A cap assembly, comprising:
a body configured to be removably coupled to a liquid container and adapted to restrict dispensing of drink liquid from an internal compartment of the liquid container; and
a purification assembly as described in any of paragraphs A-B3.

D A method of purifying a volume of drink liquid held in the drink container of any of paragraphs A-C.

In the event that any of the references that are incorporated by reference herein define a term in a manner or are otherwise inconsistent with either the non-incorporated disclosure of the present application or with any of the other incorporated references, the non-incorporated disclosure of the present application shall control and the term or terms as used therein only control with respect to the patent document in which the term or terms are defined.

The disclosure set forth above encompasses multiple distinct inventions with independent utility. While each of these inventions has been disclosed in a preferred form or method, the specific alternatives, embodiments, and/or methods thereof as disclosed and illustrated herein are not to be considered in a limiting sense, as numerous variations are possible. The present disclosure includes all novel and non-obvious combinations and subcombinations of the various elements, features, functions, properties, methods and/or steps disclosed herein. Similarly, where any disclosure above or claim below recites "a" or "a first" element, step of a method, or the equivalent thereof, such disclosure or claim should be understood to include one or more such elements or steps, neither requiring nor excluding two or more such elements or steps.

Applicant reserves the right to submit claims directed to certain combinations and subcombinations that are directed to one of the disclosed inventions and are believed to be novel and non-obvious. Inventions embodied in other combinations and subcombinations of features, functions, elements and/or properties may be claimed through amendment of those claims or presentation of new claims in that or a related application. Such amended or new claims, whether they are directed to a different invention or directed to the same invention, whether different, broader, narrower or equal in scope to the original claims, are also regarded as included within the subject matter of the inventions of the present disclosure.

INDUSTRIAL APPLICABILITY

The drink containers of the present disclosure are applicable to the hydration fields, and are specifically applicable to portable drink containers from which users may selectively drink potable drink liquid.

What is claimed is:

1. A drink container, comprising:
a liquid container having a neck with an opening and having an internal compartment sized to hold a volume of drink liquid;
a cap assembly removably coupled to the neck of the liquid container and adapted to restrict dispensing of drink liquid from the internal compartment of the liquid container through the opening, wherein the cap assembly includes a body, wherein the body includes a lower portion that defines a lower edge that is adjacent to the liquid container, and wherein the lower portion defines a recess facing the internal compartment of the liquid container when the cap assembly is coupled to the neck of the liquid container; and
a purification assembly coupled to the body of the cap assembly, wherein the purification assembly includes an ultraviolet (UV) bulb positioned within the recess, wherein the UV bulb is adapted to selectively emit UV light in the germicidal spectrum for a selected period of time and at a selected power level, to thereby purify a volume of drink liquid held in the internal compartment of the liquid container,
wherein the purification assembly comprises a controller adapted to vary the power output to the UV bulb to achieve the selected power level for emission of UV light,
wherein the purification assembly is configured to detect a power level of a power source prior to initiating a purification cycle, and compare the power level with a minimum threshold to complete a purification cycle.

2. The drink container of claim 1, wherein the UV bulb does not extend into the drink liquid when a predetermined volume of drink liquid is held in the internal compartment of the liquid container, wherein the predetermined volume is equal to a predetermined liquid capacity of the liquid container.

3. The drink container of claim 1, wherein the UV bulb does not extend beyond the lower edge of the body of the cap assembly.

4. The drink container of claim 1, wherein the cap assembly further includes a reflective surface positioned to reflect light from the UV bulb toward the internal compartment of the liquid container, and wherein the reflective surface is configured to reflect light from the UV bulb toward an entirety of the internal compartment of the liquid container.

5. The drink container of claim 1, wherein the cap assembly further includes a UV-transmissive partition positioned between the UV bulb and at least a substantial portion of the internal compartment of the liquid container when the cap assembly is coupled to the neck of the liquid container.

6. The drink container of claim 2, wherein the UV bulb is arranged in relation to the cap assembly to be optionally immersed in the predetermined volume of drink liquid if the liquid container is inclined or is inverted.

7. The drink container of claim 1, wherein the purification assembly is configured to track at least one of (a) a total number of purification cycles, and (b) the total duration of light emission from the UV bulb, and further wherein the purification assembly is configured to prevent utilization of the UV bulb beyond a predetermined lifespan related to at least one of (a) and (b).

8. The drink container of claim 1, wherein the drink container is configured such that the UV bulb selectively emits UV light to the entirety of the internal compartment of the liquid container.

9. The drink container of claim 1, wherein the drink container is configured such that the UV bulb selectively emits UV light to the entirety of the internal compartment of the liquid container without any portion of the drink container blocking the UV light from illuminating all of any drink liquid held in the internal compartment.

10. The drink container of claim 1, wherein the purification assembly is configured to determine an output level of the UV bulb and prevent utilization of the UV bulb if the output level is below a predetermined threshold.

11. The drink container of claim 1, wherein the body of the cap assembly-includes an upper portion and a threaded insert coupled to the upper portion, wherein the threaded insert includes threads adapted to mate with corresponding threads of the liquid container, wherein the threaded insert includes the lower portion of the body of the cap assembly.

12. The drink container of claim 1, wherein the controller is adapted to track the number of cycles that the UV bulb has been selectively activated, and wherein the controller is further adapted to restrict activation of the UV bulb upon the UV bulb having been activated a predetermined number of cycles.

13. The drink container of claim 1, wherein the controller is adapted to restrict activation of the UV bulb based at least in part on criteria associated with the effectiveness of the UV bulb at a given moment in time.

14. The drink container of claim 13, wherein the criteria includes a UV-transmissivity of the volume of drink liquid held in the internal compartment of the liquid container.

15. The drink container of claim 1, wherein the purification assembly includes a power source and the controller is adapted determine a potential output of the power source and to restrict activation of the UV bulb if the power source does not have sufficient output to activate the UV bulb for the predetermined period of time to purify the volume of drink liquid held in the internal compartment of the liquid container.

16. The drink container of claim 1, wherein the purification assembly is configured to select the period of time for emission of UV light on a volume of drink liquid in the liquid container.

17. The drink container of claim 1, wherein the purification assembly is adapted to detect at least one of (a) a UV-transmissivity of a drink liquid and (b) a volume of a drink liquid, and wherein the purification assembly is configured to determine a duration of UV emission and a power level of UV emission based on (a) or (b).

18. The drink container of claim 1, wherein the cap assembly comprises a translucent portion configured to allow a user visually confirm operation of the purification assembly, and further wherein the cap assembly comprises a lamp configured to emit visible light including, but not limited to, fluorescent light.

19. The drink container of claim 1, further comprising a mouthpiece to selectively dispense liquid from the internal compartment while the cap assembly is coupled to the neck of the liquid container.

20. A drink container, comprising:
a liquid container having a neck with an opening and having an internal compartment sized to hold a volume of drink liquid;
a cap assembly removably coupled to the neck of the liquid container and adapted to restrict dispensing of drink liquid from the internal compartment of the liquid container, wherein the cap assembly includes a body that defines a recess facing the internal compartment of the liquid container when the cap assembly is coupled to the liquid container; and
means for purifying drink liquid held in the internal compartment of the liquid container, wherein the means for purifying includes a UV bulb positioned within the recess, wherein the UV bulb is adapted to selectively emit UV light in the germicidal spectrum for a selected period of time and at a selected power level, to thereby purify a volume of drink liquid held in the internal compartment of the liquid container,
wherein the means for purifying drink liquid comprises a controller adapted to select the period of time for emission of UV light based at least in part on either: (a) a total number of purification cycles, or (b) the total duration of light emission from the UV bulb,
wherein the controller is adapted to determine a potential output of a power source to restrict activation of the UV bulb if the power source does not have sufficient power to activate the UV bulb for the selected period of time at the selected power level.

21. The drink container of claim 20, wherein the body of the cap assembly includes a lower portion that defines a lower edge and the recess, and wherein the UV bulb does not extend beyond the lower edge of the body of the cap assembly.

22. The drink container of claim 20, further comprising a UV-transmissive partition positioned between the UV light emitter and the internal compartment of the liquid container, wherein the UV-transmissive partition comprises quartz.

* * * * *